United States Patent
Yoshinari et al.

(10) Patent No.: US 8,522,523 B2
(45) Date of Patent: Sep. 3, 2013

(54) STEAM SYSTEM

(75) Inventors: Yuji Yoshinari, Matsuyama (JP); Yasuo Ochi, Matsuyama (JP); Hideo Furukawa, Matsuyama (JP); Yasukuni Tanaka, Matsuyama (JP); Yusuke Okamoto, Matsuyama (JP); Kazutaka Baba, Matsuyama (JP)

(73) Assignee: Miura Co., Ltd., Matsuyama-shi (JP)

( * ) Notice: Subject to any disclaimer, the term of this patent is extended or adjusted under 35 U.S.C. 154(b) by 625 days.

(21) Appl. No.: 12/919,663

(22) PCT Filed: Aug. 26, 2008

(86) PCT No.: PCT/JP2008/065184
§ 371 (c)(1),
(2), (4) Date: Aug. 26, 2010

(87) PCT Pub. No.: WO2009/110117
PCT Pub. Date: Sep. 11, 2009

(65) Prior Publication Data
US 2011/0000180 A1 Jan. 6, 2011

(30) Foreign Application Priority Data

Mar. 6, 2008 (JP) .................................. 2008-055686
Aug. 21, 2008 (JP) .................................. 2008-212381

(51) Int. Cl.
*F02C 6/00* (2006.01)
(52) U.S. Cl.
USPC ....................................................... 60/39.182
(58) Field of Classification Search
USPC ................. 60/39.182, 417, 645–683
See application file for complete search history.

(56) References Cited

U.S. PATENT DOCUMENTS

| 3,138,000 | A | * | 6/1964 | Vollmer, Jr. ................. 60/39.182 |
| 3,150,487 | A | * | 9/1964 | Mangan et al. ............. 60/39.182 |
| 4,471,446 | A | * | 9/1984 | Podolsky et al. ............. 700/290 |
| 4,494,006 | A |   | 1/1985 | Staroselsky et al. |
| 7,010,919 | B2 | * | 3/2006 | Gourbier .......................... 60/645 |
| 2004/0088984 | A1 | * | 5/2004 | Gobrecht et al. ............... 60/653 |
| 2004/0107700 | A1 | * | 6/2004 | McClanahan et al. .......... 60/670 |
| 2008/0148734 | A1 | * | 6/2008 | Althaus et al. .................. 60/650 |
| 2010/0313564 | A1 | * | 12/2010 | Glos et al. ....................... 60/645 |

FOREIGN PATENT DOCUMENTS

| GB | 2395753 | 6/2004 |
| JP | 55-158401 | 12/1980 |
| JP | 56-064197 | 6/1981 |
| JP | 62-200104 | 9/1987 |
| JP | 63-045403 | 2/1988 |
| JP | 63-92007 | 6/1988 |

(Continued)

*Primary Examiner* — Phutthiwat Wongwian
(74) *Attorney, Agent, or Firm* — Fox Rothschild LLP (57) ABSTRACT

An air compressor is driven by a steam engine that generates power using steam. The steam is supplied to the steam engine through a steam supply path, and the steam is exhausted through a steam exhaust path. The steam from the steam engine is supplied to a steam using device through a steam header. The usage load of the steam is monitored by a pressure sensor arranged in the steam header. The compressed air from the air compressor is supplied to a compressed air using device through a compressed air path. The usage load of the compressed air is monitored by a pressure sensor arranged on the compressed air path. The steam supply to the steam engine is controlled based on the usage load of the steam and the usage load of the compressed air.

11 Claims, 2 Drawing Sheets

(56) References Cited

FOREIGN PATENT DOCUMENTS

| JP | 04-116204 | 4/1992 |
| JP | 04-353201 | 8/1992 |
| JP | 04-339104 | 11/1992 |
| JP | 06-123203 | 5/1994 |
| JP | 06-147190 | 5/1994 |
| JP | 09-068006 | 3/1997 |
| JP | 2005-155349 | 6/2005 |
| JP | 2007-092721 | 4/2007 |
| JP | 2007-518932 | 7/2007 |
| WO | 2005/071231 | 8/2005 |

* cited by examiner

STEAM SYSTEM

BACKGROUND OF THE INVENTION

1. Field of the Invention

The present invention relates to a steam system that reduces power consumption by driving a compressor and the like using steam.

The present application claims priority based on Japanese Patent Application No. 2008-055686 filed in Japan on Mar. 6, 2008 and Japanese Patent Application No. 2008-212381 filed in Japan on Aug. 21, 2008, the contents of which are hereby incorporated by reference.

2. Description of the Related Art

Japanese Unexamined Patent Publication No. 63-45403 (Claims, FIG. 1, and P.2, lower left column, lines 1 to 5 of publication) discloses a method of holding the back pressure of the steam on the steam flow-out side constant regardless of the load fluctuation by driving an air compressor (2) with a screw-type expander (1), and controlling the steam that flows into the screw-type expander (1) with an adjustable valve (10) at the time of load fluctuation of the air compressor (2) and controlling a by-pass valve (9) arranged between the steam flow-in side and the steam flow-out side of the screw-type expander (1). The by-pass valve (9) is controlled by detecting the back pressure of a steam outlet tube (5) from the screw-type expander (1) with a detector (20). The adjustable valve (10) is controlled by detecting number of rotations of a drive shaft of the screw-type expander (1) with a detector (23).

Japanese Unexamined Patent Publication No. 9-68006 (claims 1, 6, 8, paragraphs [0019], [0021], [0024], and FIG. 1) discloses a gas turbine facility including a gas turbine (1), a power generator (8) driven by the gas turbine (1), an exhaust heat boiler (13) that uses the exhaust gas of the gas turbine (1) as a heat source, a screw-type steam engine (30) that uses the steam supplied from the exhaust heat boiler (13) as a power source, and a fuel compressor (11), driven by the steam engine (30), for compressing fuel and supplying the same to a combustor (3) of the gas turbine (1). In such a gas turbine facility, the fuel supply amount from the fuel compressor (11) to the gas turbine (1) is adjusted by a by-pass control valve (37) arranged between an inlet and an outlet of the fuel compressor (11), but the steam amount to be supplied to the steam engine (30) is adjusted by a control valve (32) with respect to a large load fluctuation that cannot be fully controlled with the by-pass control valve (37). The fuel compressor (11) is driven by a motor (10) at the time of startup of the exhaust heat boiler (13) or at the time of steam engine (30) failure.

Japanese Unexamined Patent Publication No. 4-353201 (paragraphs [0022] to [0028], and FIG. 1) discloses a device in which a steam turbine (9) is connected on an input side of a screw rotor of a compressor (1) by way of an electric motor (7) and a clutch (8), where the power by the steam turbine (9) is added to the power by the motor (7) to drive the screw rotor at the time of the operation of the steam turbine (9). In such a device, the steam turbine (9) is switched between drive and stop by the opening and closing of a steam valve (10). Focusing on the fact that a shaft power of the compressor (1) is dominated by an intake side pressure and a discharge side pressure, the steam valve (10) is opened to operate the steam turbine (9) when the shaft power of the compressor (1) is within a tolerable power range based on a low-pressure pressure detector (18) for detecting the intake side pressure of the compressor (1) and a high-pressure pressure detector (19) for detecting the discharge side pressure. The compressor (1) has the slide valve thereof controlled by a capacity control device (14) so as to be capacity controlled.

SUMMARY OF THE INVENTION

In the case of the invention disclosed in Japanese Unexamined Patent Publication No. 63-45403, the steam amount to be supplied to the screw-type expander (1) is controlled by adjusting the adjustable valve (10) to hold the rotation of the air compressor (2) constant regardless of the load fluctuation thereof, but the ability control of the air compressor (2) is carried out by an unloader (P.2, lower right column, line 18 to P.3, upper left column, line 5 of publication). Alternatively, the ability control of the air compressor (2) is carried out by controlling the steam amount to be supplied to the screw-type expander (1) with the adjustable valve (10) and changing the number of rotations of the screw-type expander (1) (P.3, upper left column, lines 5 to 9 of publication). However, since the adjustable valve (10) is controlled by detecting the number of rotations of the drive shaft of the screw-type expander (1) with the detector (23), the number of rotations of the drive shaft is merely detected by the detector (23) and the steam supply amount to the screw-type expander (1) is adjusted with the adjustable valve (10) so that the screw-type expander (1) realizes the desired number of rotations. Therefore, the control is not such that the load fluctuation of the air compressor (2) is detected and the response is rapidly and accurately made with respect to such load fluctuation.

In the case of the invention disclosed in Japanese Unexamined Patent Publication No. 9-68006, the fuel supply amount to the gas turbine (1) is controlled by the by-pass control valve (37) arranged on the fuel compressor (11) side instead of the steam engine (30) and the control valve (32) for adjusting the steam amount to the steam engine (30). Therefore, the structure and the control become complicating.

In the case of the invention disclosed in Japanese Unexamined Patent Publication No. 4-353201, the steam valve (10) can only be opened and closed with the use of the steam turbine (9) as the steam engine, and the output adjustment of the steam engine cannot be made.

Furthermore, none of the inventions disclosed in the patent documents control the steam supply to the steam engine while taking also the usage load of the steam into consideration. In other words, none of the inventions disclosed in the patent documents control the steam supply to the steam engine based on both the usage load of the steam of the area where the steam from the steam engine is supplied and the usage load of the fluid discharged from the compressor.

To solve the problems, an object of the present invention is to enhance the operation efficiency by controlling the steam supply to the steam engine taking not only the fluid load but also the steam load into consideration with a simple configuration and control.

The present invention has been proposed to solve the above problem, where the invention described in claim 1 relates to a steam system including a prime mover that generates power using steam; a driven machine, driven by the prime mover, for discharging or taking in fluid; a by-pass path for supplying steam to an area where steam used in the prime mover is supplied without passing the prime mover; and a controller for controlling steam supply to the prime mover based on a steam load of an area where steam from the prime mover and steam from the by-pass path are supplied, and a fluid load in a space to which fluid is discharged or from which fluid is taken in by the driven machine.

According to the invention described in claim 1, the operation efficiency can be enhanced by controlling the steam supply to each prime mover taking not only the fluid load but also the steam load into consideration.

The invention described in claim 2 relates to the steam system according to claim 1, wherein the steam supply to the prime mover is controlled by a steam supply valve arranged on a steam supply path to the prime mover.

According to the invention described in claim 2, the steam supply to the prime mover can be easily controlled by the steam supply valve arranged on the steam supply path to the prime mover.

The invention described in claim 3 relates to the steam system according to claim 2, wherein a by-pass valve is arranged on the by-pass path; and the by-pass valve is a self-depressurization valve that operates to maintain a steam pressure of the area where the steam from the prime mover and the steam from the by-pass path are supplied to a predetermined steam pressure.

According to the invention described in claim 3, the steam supply through the by-pass path is carried out on its own by using the self-depressurization valve. Therefore, the configuration and the control of the entire steam system become easy and simple.

The invention described in claim 4 relates to the steam system according to claim 1, wherein the steam supply to the prime mover is controlled by a by-pass valve arranged on the by-pass path connecting a steam supply path to the prime mover and a steam exhaust path from the prime mover.

According to the invention described in claim 4, the steam supply to the prime mover can be easily controlled by the by-pass valve arranged on the by-pass path connecting the steam supply path to the prime mover and the steam exhaust path from the prime mover.

The invention described in claim 5 relates to the steam system according to any one of claims 1 to 4, wherein the steam supply to the prime mover is executed if the fluid load and the steam load are present; the steam supply to the prime mover is stopped if the fluid load and the steam load are not present; and the steam is supplied through the by-pass path with the steam supply to the prime mover stopped if the fluid load is not present but the steam load is present.

According to the invention described in claim 5, the prime mover is prevented from being wastefully operated and the operation efficiency can be enhanced by carrying out the control in view of the fluid load and the steam load.

The invention described in claim 6 relates to the steam system according to claim 5, wherein the driven machine or a second driven machine having the same function is driven with an electric motor if the fluid load is present but the steam load is not present.

According to the invention described in claim 6, the electric motor is arranged in addition to the prime mover that generates power using steam, and thus the fluid can be stably discharged or taken in regardless of the steam load.

The invention described in claim 7 relates to the steam system according to claim 6, wherein the prime mover is a screw-type steam engine; the driven machine is an air compressor; whether or not the fluid load is present is detected by determining whether or not pressure in a space to which the fluid is discharged by the driven machine is smaller than a set value; and whether or not the steam load is present is detected by determining whether or not the steam pressure of the area where the steam from the prime mover and the steam from the by-pass path are supplied is smaller than a predetermined value.

According to the invention described in claim 7, the efficiency is better than the turbine type through the use of the screw-type steam engine. In the case of the screw-type steam engine, the output can be adjusted by adjusting the steam supply amount if desired. Furthermore, excellent versatility is realized since the air compressor widely used for operation of an air driving machine in various types of factories and business establishments, for manufacturing process such as blowing and drying, and in other fields is driven. The air load and the steam load can be easily grasped by pressure and controlled.

The invention described in claim 8 relates to the steam system according to claim 5, wherein the steam supply to the prime mover is executed even if the fluid load is present but the steam load is not present.

According to the invention described in claim 8, the fluid can be stably discharged or taken in regardless of the steam load without necessarily arranging the electric motor separately. Furthermore, the electric power can be reduced since the electric motor is not used.

The invention described in claim 9 relates to the steam system according to claim 8, wherein the prime mover is a screw-type steam engine; the driven machine is an air compressor; whether or not the fluid load is present is detected by determining whether or not pressure in a space to which the fluid is discharged by the driven machine is smaller than a set value; and whether or not the steam load present is detected by determining whether or not the steam pressure of the area where the steam from the prime mover and the steam from the by-pass path are supplied is smaller than a predetermined value.

According to the invention described in claim 9, the efficiency is better than the turbine type through the use of the screw-type steam engine. In the case of the screw-type steam engine, the output can be adjusted by adjusting the steam supply amount if desired. Furthermore, excellent versatility is realized since the air compressor widely used for operation of an air driving machine in various types of factories and business establishments, for manufacturing process such as blowing and drying, and in other fields is driven. The air load and the steam load can be easily grasped by pressure and controlled. The invention described in claim 10 relates to the steam system according to claim 3 or 4, including a boiler for supplying steam to the prime mover through the steam supply, path; wherein drain from the prime mover is supplied to a water supply tank for the boiler.

According to the invention described in claim 10, the drain exhausted from the steam engine can be effectively utilized.

The invention described in claim 11 relates to the steam system according to claim 10, wherein the compressor is cooled using water supply to the boiler or to the water supply tank.

According to the invention described in claim 11, the energy can be saved since the water supply is warmed with heat dissipation of the compressor.

According to the steam system of the present invention, the steam supply to the steam engine can be controlled and the operation efficiency can be enhanced taking not only the fluid load but also the steam load into consideration with a simple configuration and control.

DETAILED DESCRIPTION OF THE PREFERRED EMBODIMENTS

Embodiments of the present invention will now be described.

The steam system of the present, invention includes a prime mover that generates power using steam, and a driven machine such as a compressor or a vacuum pump that is driven by the prime mover.

The prime mover is a steam engine that generates power using steam. The steam engine may be a steam turbine, but is suitably a screw-type steam engine. The screw-type steam engine is a device in which the steam is introduced between screw rotors that engage with each other, and the steam expands while rotating the screw rotors with the steam thereby causing depressurization so that the power is obtained by the rotation of the screw rotor at the time. The rotational power obtained by the steam engine is used to drive the driven machine. In this case, the driven machine is preferably directly driven without interposing a power generator.

The driven machine is a device that is driven by the steam engine and that discharges or takes in fluid. Specifically, the driven machine includes a pump, an air blower, a compressor, or a vacuum pump. The driven machine discharges fluid in the case of the pump, the air blower, or the compressor, and takes in fluid in the case of the vacuum pump.

The driven machine is, for example, a compressor. Such a compressor may be of any type such as a reciprocating type or a rotating type, but is suitably a screw-type compressor. The screw-type compressor is a device that takes in gas to between the screw rotors that rotate while engaging with each other, compresses the gas through rotation of the screw rotors and discharges the same. The gas compressed by the compressor may be of any type, and may be air, steam, refrigerant gas, and the like. However, the air compressor has excellent versatility since the compressed air can be used in a wide range of fields.

The steam is supplied to the steam engine from a steam supply source through a steam supply path. Typically, the steam supply source is a steam boiler. The water is supplied to the boiler from a water supply tank and then evaporated in the boiler. The steam then can be supplied to the steam engine. The steam from the boiler may be supplied to a steam header (referred to as the first steam header), and the steam of the steam header may be supplied to the steam engine through the steam supply path.

The steam used in the steam engine is exhausted through a steam exhaust path. The steam engine also functions as a depressurization valve as it depressurizes steam. Thus, the steam used in the steam engine can be used similar to the steam that passed the depressurization valve of the prior art. In other words, the steam from the boiler is conventionally supplied to a steam using device through the depressurization valve, and similarly, the steam used in the steam engine can also be supplied to the steam using device. In this case, the steam from the steam engine may be supplied to a steam header (referred to as the second steam header) through the steam exhaust path, and the steam of the steam header may be supplied to the steam using device.

The steam can be supplied to the area where the steam used in the steam engine is supplied even through a by-pass path without passing the steam engine. Typically, the steam from the steam supply source can be supplied to the steam exhaust path or the second steam header even through the by-pass path. In this case, the steam supply path and the steam exhaust path with respect to the steam engine may be connected with the by-pass path, or the first steam header and the second steam header may be connected with the by-pass path. The steam may also be supplied to the steam exhaust path or the second steam header through the by-pass path from an area different from the steam supply source. In any event, the by-pass path includes a by-pass valve. The by-pass valve may be an electromagnetic valve or an electric valve, or may be a self-depressurization valve. In this case, the by-pass valve self-adjusts the opening degree mechanically so as to maintain the steam pressure of the area, where the steam from the steam engine and the steam from the by-pass path are supplied, to a predetermined steam pressure.

The steam engine is controlled by controlling the presence or the amount of steam supply to the steam engine. Specifically, a steam supply valve is arranged on the steam supply path to the steam engine, and the opening/closing or the opening degree of the steam supply valve is controlled. The presence or the amount of steam supply to the steam engine thus can be changed, and the presence or the output of the operation of the steam engine can be changed.

For instance, if the steam engine is a steam turbine, the presence of steam supply to the steam turbine can be switched by controlling the opening/closing of the steam supply valve. The presence of the operation of the steam turbine thus can be changed. If the steam engine is a screw-type steam engine, the opening/closing of the steam supply valve may be controlled similar to the steam turbine, or the opening degree of the steam supply valve may be controlled. When controlling the opening degree of the steam supply valve, the output of the screw-type steam engine can be changed by adjusting the steam supply amount to the screw-type steam engine.

However, the control of the steam engine is not limited to the above configurations. In other words, the steam engine merely needs to have the presence or the amount of steam supply changeable, and the steam supply valve may not be arranged on the steam supply path and the control may not be necessarily made by such a steam supply valve. For instance, the steam supply path and the steam exhaust path with respect to the steam engine may be connected with the by-pass path, as described above, and the opening/closing or the opening degree of the by-pass valve arranged on the by-pass path may be controlled. Such a by-pass valve may be arranged in addition to the steam supply valve.

The steam engine has the steam supply controlled based on the fluid load in a space, to which the fluid is discharged or from which the fluid is taken in by the driven machine, and the steam load on the outlet side of the steam engine.

The fluid load is the load of the fluid in the space to which the fluid is discharged or from which the fluid is taken in by the driven machine. Specifically, if the driven machine is the pump, the air blower, or the compressor, the fluid load is the usage amount of the fluid in the space to which such a driven machine discharges. If the driven machine is the vacuum pump, the fluid load is the existence amount of the fluid in the space from which such a driven machine takes in. That is, if the driven machine is the vacuum pump, the decrease in the degree of vacuum indicates that the fluid load is present.

Either fluid load can be detected by the pressure in the space to which the fluid is discharged or from which the fluid is taken in by the driven machine. For instance, if the driven machine is the air compressor, the usage load (referred to as air load) of the compressed air can be detected based on the pressure in the tube that sends the compressed air to one or a plurality of compressed air using devices, or the tank. In other words, when the compressed air is used in the compressed air using device, the air load can be detected as the air pressure in the tube or the tank lowers.

The steam load is the usage amount of the steam of the area where the steam used in the steam engine is supplied. The steam load can be detected by the steam pressure of the area where the steam used in the steam engine is supplied. For instance, the usage load (steam load) of the steam can be detected based on the steam pressure of the steam exhaust path from the steam engine or the second steam header arranged ahead of the steam exhaust path. In other words, when the steam is used in the steam using device, the steam load can be detected as the steam pressure of the steam exhaust path or the second steam header lowers.

Thus, both the fluid load and the steam load can be easily detected with pressure. The steam supply to the steam engine thus can be controlled based on the pressure in the space to which the fluid is discharged or from which the fluid is taken in by the driven machine and the steam pressure of the area where the steam used in the steam engine is supplied.

In this case, the control is easily made in the following manner, and the energy can be saved. Specifically, the steam supply to the steam engine is executed if the fluid load and the steam load are present, and the steam supply to the steam engine is stopped if the fluid load and the steam load are not present. Furthermore, the steam supply to the second steam header and the steam using device is executed through the by-pass path with the steam supply to the steam engine stopped if the fluid load is not present but the steam load is present. The steam supply is mechanically performed on its own if the by-pass valve is a self-depressurization valve.

The driven machine is preferably driven with a second prime mover if the fluid load is present but the steam load is not present. The second prime mover will be described here as an electric motor (motor), but may be a diesel engine and the like as long as it is other than a steam engine. The steam engine and the electric motor may have a configuration of driving a common driven machine, or a first driven machine driven by the steam engine and a second driven machine driven by the electric motor may be separately configured.

In the latter case, the second driven machine is a device that discharges or takes in fluid, similar to the first driven machine, with respect to a space to which the fluid is discharged or from which the fluid is taken in by the first driven machine. Thus, the second driven machine has the same function as the first driven machine. For instance, if the first driven machine is an air compressor, the second driven machine is also an air compressor. The second driven machine may not necessarily have the same mechanism as long as the functions are the same with the first driven machine. For instance, if the first driven machine is a screw-type air compressor, the second driven machine is not limited to a screw-type and may be a reciprocating type as long as it is an air compressor.

The steam supply to the steam engine may be executed even if the fluid load is present but the steam load is not present. In this case, the driven machine can be stably driven regardless of the steam load without necessarily arranging the electric motor separately. The power can be reduced as the electric motor is not used. However, even if the steam system includes the electric motor, such control can be executed without operating the electric motor.

When the driven machine is the pump, the air blower, or the compressor, whether or not the fluid load is present can be detected by determining whether or not the detected pressure of a pressure sensor arranged in the space to which the fluid is discharged by the driven machine is smaller than a set value. That is, determination is made that the fluid load is present if smaller than the set value, and determination is made that the fluid load is not present if greater than or equal to the set value. If the driven machine is the vacuum pump, whether or not the fluid load is present can be detected by determining whether or not the detected pressure of a pressure sensor arranged in a space from which the fluid is taken in by the driven machine is greater than or equal to a set value. That is, determination is made that the fluid load is present if greater than or equal to the set value, and determination is made that the fluid load is not present if, smaller than the set value.

Furthermore, whether or not the steam load is present can be detected by determining whether or not the detected pressure of a pressure sensor arranged on the steam exhaust path or the second steam header to which the steam used in the steam engine is supplied is smaller than a predetermined value. That is, determination is made that the steam load is present if smaller than the predetermined value, and determination is made that the steam load is not present if greater than or equal to the predetermined value.

In each embodiment described above, the drain from the steam engine may be returned to the water supply tank for the boiler to realize heat collection. The driven machine such as the compressor may be cooled using the water supply to the boiler or to the water supply tank. This also has a merit in that the water supply to the boiler can be warmed by the heat dissipation of the compressor.

Example 1

Specific examples of the present invention will be described in detail below with reference to the drawings.

Figure 1:
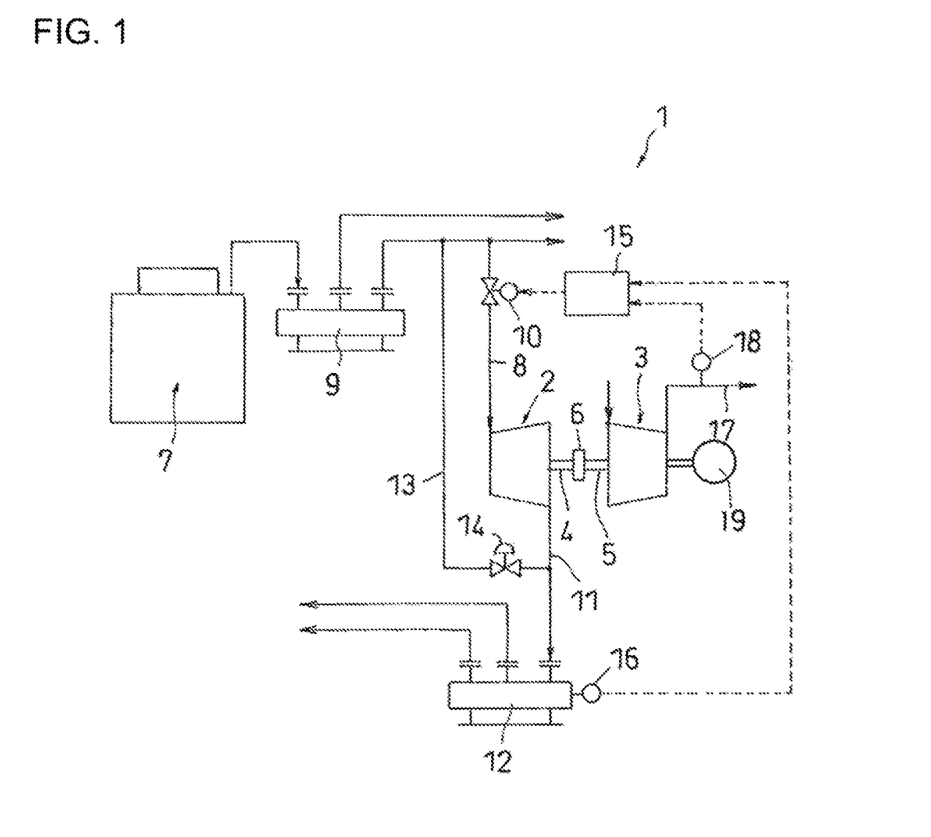
FIG. 1 is a schematic view showing Example 1 of a steam system of the present invention.

FIG. 1 is a schematic view showing Example 1 of a steam system of the present invention. A steam system 1 of the present example includes a prime mover 2 that generates power using steam, and a driven machine 3 that is driven by the prime mover.

The prime mover 2 is a steam engine that generates power by receiving steam. The steam engine 2 may be a steam turbine, but is suitably a screw-type steam engine. The screw-type steam engine is a device in which the steam is introduced between screw rotors that engage with each other, and the steam expands while rotating the screw rotors with the steam thereby causing depressurization so that the power is obtained by the rotation of the screw rotor at the time.

The driven machine 3 is a device that is driven by the steam engine 2 and that discharges or takes in fluid. Specifically, the driven machine 3 includes a pump, an air blower, a compressor, a vacuum pump, or the like. The driven machine 3 of the present example is an air compressor. The compressor 3 may be of any type, but is suitably a screw-type compressor. The screw-type compressor is a device that takes in gas to between the screw rotors that rotate while engaging with each other, compresses the gas through rotation of the screw rotors and discharges the same.

The compressor 3 is driven by the steam engine 2. Specifically, the screw rotors of the screw-type compressor 3 are rotated using the rotational drive force of the screw rotor of the screw-type steam engine 2. In this case, an output shaft 4 of the steam engine 2 and an input shaft 5 of the compressor 3 are connected with a coupling 6 without interposing a power generator. The output shaft 4 and the input shaft 5 may be connected through a clutch. In this case, the presence of drive of the compressor 3 by the steam engine 2 can be switched by the clutch. The clutch may also include a transmission. In this case, the discharge pressure of the compressor 3 can be changed by changing the transmission gear ratio. Furthermore, the output shaft 4 and the input shaft 5 may be connected through an electric motor (motor). In this case, the compressor 3 can have the drive ratio changed so as to be drivable by one or both of the steam engine 2 and the electric motor. In the present example, the compressor 3 is connected to the steam engine 2 and an electric motor 19, as shown in FIG. 1. The compressor 3 thus can be driven by the steam engine 2 and can also be driven by the electric motor 19.

The steam from a steam boiler 7 is supplied to the steam engine 2 through a steam supply path 8. In the present example, the steam from the steam boiler 7 is supplied to a first steam header 9, and the steam of the first steam header 9 is supplied to the steam engine 2 through the steam supply path 8. A steam supply valve 10 is arranged on the steam supply path 8 from the first steam header 9 to the steam engine 2. The presence of operation of the steam engine 2 is switched by controlling the opening/closing of the steam supply valve 10. The output of the steam engine 2 may be adjusted by controlling the opening degree of the steam supply valve 10.

The steam used in the steam engine 2 can be used in various types of steam using devices (not illustrated). In the present example, the steam from the steam engine 2 is supplied to a second steam header 12 through a steam exhaust path 11, and the steam of the second steam header 12 is supplied to various types of steam using devices. The steam engine 2 not only drives the compressor 3, but also functions as a depressurization valve. Therefore, the steam used in the steam engine 2 can be used as is in various types of steam using devices as steam having been passed the depressurization valve.

The first steam header 9 and the second steam header 12 are also connected through a by-pass path 13. In the illustrated example, an upstream portion than the steam supply valve 10 of the steam supply path 8 from the first steam header 9 to the steam engine 2 and an intermediate portion of the steam exhaust path 11 from the steam engine 2.to the second steam header 12 are connected with the by-pass path 13. A by-pass valve 14 is arranged at the intermediate portion of the by-pass path 13. The by-pass valve 14 may be an electromagnetic valve or an electric valve that is controlled by a controller 15, but is a self-depressurization valve in the present example. Specifically, the by-pass valve 14 self-adjusts the opening degree mechanically so as to maintain the steam pressure in the second steam header 12 to a predetermined steam pressure. In any event, the steam supply through the steam engine 2 is preferably prioritized under the condition that the steam may be supplied to the second steam header 12 either through the steam engine 2 or through the by-pass valve 14.

Therefore, the steam system 1 of the present example includes two steam headers 9, 12 having different pressures and temperatures. The steam in each steam header 9, 12 is suppliable to the desired steam using device (not illustrated), respectively. Since the steam in each steam header 9, 12 has a different temperature, the steam can be used according to applications. In other words, the steam may be supplied from the first steam header 9 if steam of a relatively high temperature is required, and the steam may be supplied from the second steam header 12 if steam of lower temperature is required.

The operating state of the steam boiler 7 of the present example is controlled based on the steam pressure in the first steam header 9. Specifically, the combustion amount of the burner is controlled based on the steam pressure in the first steam header 9.

The second steam header 12 includes a first pressure sensor 16 to grasp the usage load of the steam thereof. The steam pressure in the second steam header 12 is monitored by the first pressure sensor 16. Therefore, whether or not the steam load is present can be detected by determining whether or not the steam pressure is smaller than a predetermined value. In other words, when the steam is used, the usage load of the steam can be detected by determining whether or not the steam pressure of the second steam header 12 is smaller than a predetermined value as the steam pressure in the second steam header 12 lowers.

The compressed air from the compressor 3 can be supplied to one or a plurality of compressed air using devices (not illustrated) through a compressed air path 17. The compressed air path 17 includes a second pressure sensor 18 to grasp the usage load of the compressed air. The air pressure of the compressed air path 17 is monitored by the second pressure sensor 18. Therefore, whether or not the air load is present can be detected by determining whether or not the air pressure is smaller than a set value. In other words, when the compressed air is used, the usage load of the compressed air can be detected by determining whether or not the air pressure of the compressed air path 17 is smaller than a set value as the air pressure of the compressed air path 17 lowers. A hollow air tank (not illustrated) may be arranged in the middle of the compressed air path 17, and the second pressure sensor 18 may be arranged in the air tank to detect the usage load of the compressed air.

In the steam system 1 of the present example, the controller 15 constantly monitors the detected pressure of the first pressure sensor 16 and the second pressure sensor 18, and controls the opening/closing of the steam supply valve 10, as hereinafter described, based thereon. The controller 15 may be configured to control the opening degree of the steam supply valve 10 if desired. Furthermore, the controller 15 may control the by-pass valve 14, the clutch, and the like if desired. In the present example, however, the by-pass valve 14 is a self-depressurization valve, as previously described.

The controller 15 opens the steam supply valve 10 and operates the steam engine 2 when detecting that the air load is present when the air pressure of the second pressure sensor 18 is smaller than a set value, and detecting that the steam load is present when the steam pressure of the first pressure sensor 16 is smaller than a predetermined value.

The controller 15 closes the steam supply valve 10 and stops the steam engine 2 when detecting that the air load is not present when the air pressure of the second pressure sensor 18 is greater than or equal to the set vane, and detecting that the steam load is not present when the steam pressure of the first pressure sensor 16 is greater than or equal to the predetermined value.

The controller 15 closes the steam supply valve 10 and stops the steam engine 2 when detecting that the air load is not present when the air pressure of the second pressure sensor 18 is greater than or equal to the set value, and detecting that the steam load is present when the steam pressure of the first pressure sensor 16 is smaller than the predetermined value. In this case, the steam is supplied through the by-pass path 13 to the second steam header 12 and furthermore, to the steam using device.

Furthermore, the controller 15 drives the compressor 3 by means of the electric motor 19 when detecting that the air load is present when the air pressure of the second pressure sensor 18 is smaller than the set value and detecting that the steam load is not present when the steam pressure of the first pressure sensor 16 is greater than or equal to the predetermined value. In this case, the compressor 3 may be driven with the electric motor 19 or a different compressor may be driven. In the latter case, the compressed air from the first compressor 3 driven by the steam engine 2 and the compressed air from the second compressor driven by the electric motor 19 are supplied to the compressed air using device through the common compressed air path 17 or the air tank.

The controller 15 may open the steam supply valve 10 and operate the steam engine 2 even when detecting that the air load is present when the air pressure of the second pressure sensor 18 is smaller than the set value and detecting that the steam load is not present when the steam pressure of the first pressure sensor 16 is greater than or equal to the predetermined value. In this case, the electric motor 19 is not necessarily required. When desiring to suppress the use of electricity as much as possible at the time of power peak in the summertime, the steam can be supplied to the steam engine 2 to drive the compressor 3 without using the electrical type of large power consumption even when the steam load is not present.

The compressor 3 is ON/OFF controlled in the present example, but may be capacity controlled according to circumstances. In such a case, the adjustment of the opening degree of the steam supply valve 10 to the steam engine 2 and the inverter control of the electric motor 19 are easy and simple.

Example 2

Figure 2:
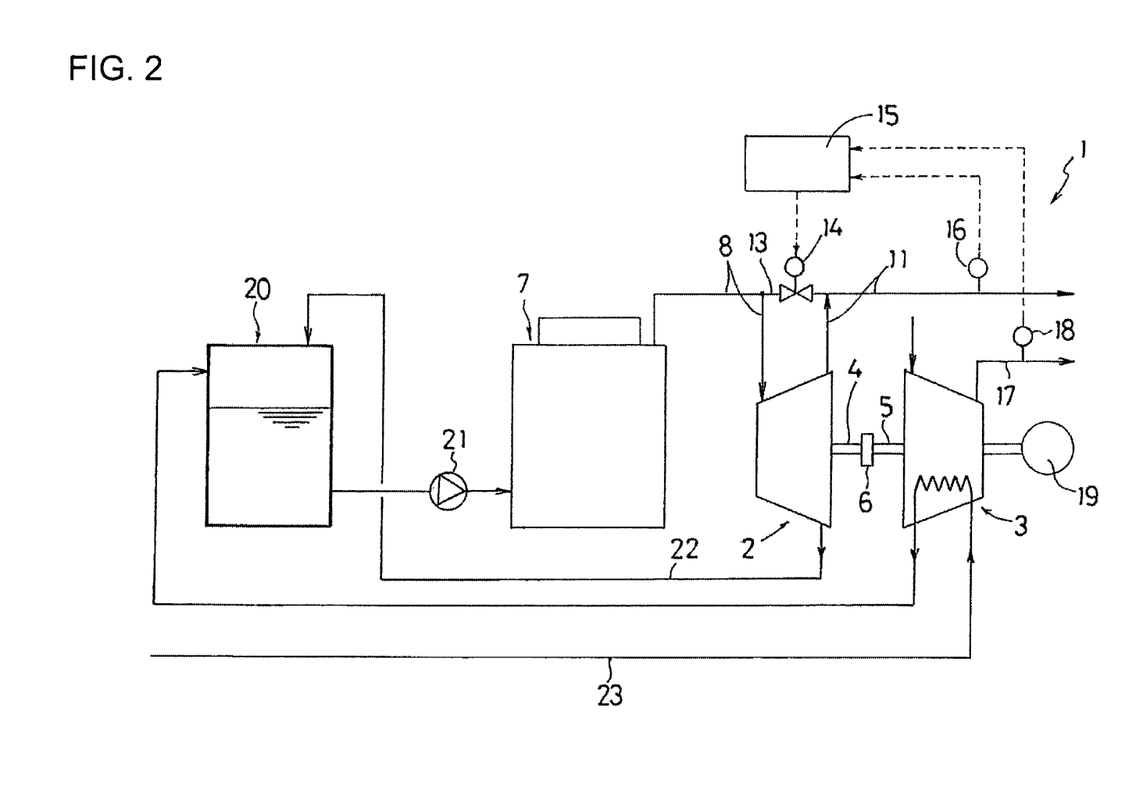
FIG. 2 is a schematic view showing Example 2 of the steam system of the present invention.

FIG. 2 is a schematic view showing Example 2 of the steam system 1 of the present invention. The steam system 1 of Example 2 is basically similar to that of Example 1. Thus, the different aspects will be centrally described below, and the description will be made with the same reference numerals denoted to the corresponding components.

The steam system 1 of Example 2 also includes the steam engine 2 that generates power using steam, and the compressor 3 driven by the steam engine 2.

The steam engine 2 of the present example is also a screw-type steam engine. The steam from the boiler 7 is supplied to the steam engine 2 through the steam supply path 8, and the steam used in the steam engine 2 is sent to the steam using device (not illustrated) through the steam exhaust path 11. In this case, similar to Example 1, the steam from the boiler 7 may be supplied to the first steam header 9 (FIG. 1) and the steam of the first steam header 9 may be supplied to the steam engine 2, or the steam from the steam engine 2 may be supplied to the second steam header 12 (FIG. 1) and the steam of the second steam header 12 may be supplied to the steam using device.

The boiler 7 may be of any type as long as it is a steam boiler. Similar to Example 1, the water (soft water) from a water supply tank 20 is supplied to the boiler 7 and evaporated. Specifically, a predetermined amount of water is stored in the water supply tank 20, and such water is supplied to the boiler through a water supply pump 21. The water supplied to the boiler 7 is heated and evaporated in the boiler 7. The steam is then supplied from the steam supply path 8 to the steam engine 2 through a steam-water separator (not illustrated) and the first steam header 9 (FIG. 1) if desired. The boiler 7 has the combustion amount of the burner (not illustrated) controlled so that the pressure in the can is maintained at a predetermined pressure.

The steam supply path 8 to the steam engine 2 and the steam exhaust path 11 from the steam engine 2 are connected with the by-pass path 13. In Example 2, the by-pass path 13 includes the by-pass valve 14 configured by an opening degree adjustable electric valve. Similar to Example 1, the steam supply valve 10 (FIG. 1) may be arranged on the steam supply path 8 if desired. In this case, the steam supply valve 10 merely needs to be configured by an electromagnetic valve for controlling the presence of steam supply to the steam engine 2 since the steam supply amount to the steam engine 2 is basically adjusted with the by-pass valve 14 in Example 2.

In the steam system 1 of Example 2 as well, the controller 15 is connected to each pressure sensor 16, 18, and the like other than the by-pass valve 14. The controller 15 controls the by-pass valve 14 and also controls the electric motor 19, as necessary, based on the detected pressure of the second pressure sensor 18 and furthermore, the first pressure sensor 16 if desired. For instance, the opening degree of the by-pass valve 14 is adjusted so that the detected pressure of the second pressure sensor 18 maintains a set pressure. Specifically, the opening degree is adjusted in the direction of closing the by-pass valve 14 if the detected pressure of the second pressure sensor 18 becomes lower than the set pressure. Thus, the compressor 3 can be operated in accordance with the usage load of the compressed air by adjusting the steam supply amount to the steam engine 2.

The by-pass valve 14 may be controlled based not only on the detected pressure (air pressure) of the second pressure sensor 18 but also on the detected pressure (steam pressure) of the first pressure sensor 16. That is, the steam system 1 of Example 2 can be controlled, similar to Example 1. Specifically, the controller 15 executes the steam supply to the steam engine 2 if the air load and the steam load are present, and stops the steam supply to the steam engine 2 if the air load and the steam load are not present.

In Example 2, the steam supply amount to the steam engine 2 can be increased the smaller the opening degree of the by-pass valve 14, and the steam supply amount to the steam engine 2 can be reduced the greater the opening degree of the by-pass valve 14. Therefore, in order to stop the steam supply to the steam engine 2, the steam supply to the steam engine 2 is substantially reduced by increasing the opening degree (typically, fully opening) of the by-pass valve 14. Alternatively, the steam supply valve 10 configured by an electromagnetic valve may be arranged on the steam supply path 8, and the steam supply valve 10 may be closed, as described above.

The controller 15 supplies steam through the by-pass path 13 with the steam supply to the steam engine 2 stopped if the air load is not present but the steam load is present. The controller 15 drives the compressor 3 or the second compressor with the electric motor 19 if the air load is present but the steam load is not present. Similar to Example 1, however, the steam supply to the steam engine 2 may be executed if the air load is present but the steam load is not present.

The drain from the steam engine 2 is returned to the water supply tank 20 through a drain collection path 22. A water supply path 23 to the water supply tank 20 is preferably connected to the water supply tank 20 through the compressor 3. In this case, the compressor 3 can be cooled by the water supply to the water supply tank 20, and the water supply can be warmed by the heat dissipation of the compressor 3. Such a configuration is not only applicable to Example 2 but is also similarly applicable to Example 1.

The steam system of the present invention is not limited to the configuration of each example described above, and can be appropriately changed. For instance, the steam engine 2 is a screw-type in each example described above, but may be a turbine type according to circumstances.

In Example 1, the usage load of the steam is detected by the first pressure sensor 16 arranged in the second steam header 12, but the first pressure sensor 16 may not be arranged in the second steam header 12 and may be arranged on a tube path of after the merging of the steam exhaust path 11 from the steam engine 2 and the by-pass path 13, similar to Example 2. In such a case, the installation of the second steam header 12 may be omitted.

In each example described above, the pump or the air blower may be installed in place of the compressor 3. In this case as well, the control is carried out similar to each example described above. Furthermore, the vacuum pump may be installed in place of the compressor 3. In this case, the steam engine 2 or the electric motor 19 is controlled based on the pressure in the space from which the vacuum pump, driven by the steam engine 2 and the electric motor 19, takes in.

Moreover, in each example described above, the "set value" and/or the "predetermined value" may obviously be set with an operation gap (differential), respectively, to prevent hunting of the opening/closing of the steam supply valve 10. For instance, in Example 1, the steam supply valve 10 may be opened when the set lower limit pressure is reached with the use of the compressed air, and the steam supply valve 10 may be closed when the set upper limit pressure is reached. Furthermore, the steam supply valve 10 may be opened when the predetermined lower limit pressure is reached with the use of the steam in the second steam header 12, and the steam supply valve 10 may be closed when the predetermined upper limit pressure is reached. Similarly, the controller 15 may control the opening degree of the steam supply valve 10 and/or the by-pass valve 14 so as to maintain the air pressure to a set pressure region based on the detected pressure of the second pressure sensor 18. The controller 15 may also control the opening degree of the steam supply valve 10 so as to maintain the steam pressure to a predetermined pressure region based on the detected pressure of the first pressure sensor 16.

Only one boiler 7 is installed in FIGS. 1 and 2, but the boiler 7 may be installed in plurals. In this case, the steam from each boiler 7, 7, . . . is collected at the first steam header 9 (FIG. 1) and then supplied to the steam engine 2 and the by-pass path 13. In this case, some of the steam from the first steam header 9 may be directly supplied to the steam using device without passing the steam engine 2 or the by-pass path 13.

Similarly, some of the steam from the first steam header 9 may be directly supplied to the steam using device without passing the steam engine 2 or the by-pass path 13 in each example. Furthermore, an example of cooling the compressor 3 with the water supply to the water supply tank 20 has been described in FIG. 2, but in place thereof or in addition thereto, the bearing portion of the steam engine 2 may be cooled. The compressor 3, and the like is cooled by cooling with the water supply to the water supply tank 20, but may be cooled with the water supply from the water supply tank 20 to the boiler 7 according to circumstances.

Moreover, in each example described above, as long as the configuration of controlling the steam supply to the steam engine 2 based on the steam load and the fluid load is realized, the specific method thereof can be appropriately changed. For instance, a valve which opening/closing or opening degree is adjusted may be arranged in the middle of the steam exhaust path 11 from the steam engine 2 to the second steam header 12. A valve which opening/closing or opening degree is adjusted may be arranged at the upstream portion than the area where the by-pass path 13 branches of the steam supply path 8 from the first steam header 9 to the steam engine 2, or the downstream portion than the area where the by-pass path 13 merges of the steam exhaust path 11 from the steam engine 2 to the second steam header 12.

What is claimed is:

1. A steam system comprising:
    a prime mover that generates power using steam;
    a driven machine, driven by the prime mover, for discharging or taking in fluid;
    a by-pass path for supplying steam to an area where steam used in the prime mover is supplied without passing the prime mover; and
    a controller is programmed to control steam supply to the prime mover based on a steam load of an area where steam from the prime mover and steam from the by-pass path are supplied, and a fluid load in a space to which fluid, is discharged or from which fluid is taken in by the driven machine.

2. The steam system according to claim 1, wherein the steam supply to the prime mover is controlled by a steam supply valve arranged on a steam supply path to the prime mover.

3. The steam system according to claim 2, wherein
    a by-pass valve is arranged on the by-pass path; and
    the by-pass valve is a self-depressurization valve that operates to maintain a steam pressure of the area where the steam from the prime mover and the steam from the by-pass path are supplied to a predetermined steam pressure.

4. The steam system according to claim 1, wherein
    the by-pass path is arranged connecting a steam supply path to the prime mover and a steam exhaust path from the prime mover; and
    the steam supply to the prime mover is controlled by a by-pass valve arranged on the by-pass path.

5. The steam system according to claim 1, wherein
    the steam supply to the prime mover is executed in a case where the fluid load and the steam load are present;
    the steam supply to the prime mover is stopped in a case where the fluid load and the steam load are not present; and
    the steam is supplied through the by-pass path with the steam supply to the prime mover stopped in a case where the fluid load is not present but the steam load is present.

6. The steam system according to claim 5, wherein the driven machine or a second driven machine having an identical function to that of the driven machine is driven with an electric motor in the case where the fluid load is present but the steam load is not present.

7. The steam system according to claim 6, wherein
    the prime mover is a screw-type steam engine;
    the driven machine is an air compressor;
    whether or not the fluid load is present is detected by determining whether or not pressure in a space to which the fluid is discharged by the driven machine is smaller than a set value; and
    whether or not the steam load is present is detected by determining whether or not the steam pressure of the area where the steam from the prime mover and the steam from the by-pass path are supplied is smaller than a predetermined value.

8. The steam system according to claim 5, wherein the steam supply to the prime mover is executed even in the case where the fluid load is present but the steam load is not present.

9. The steam system according to claim 8, wherein
    the prime mover is a screw-type steam engine;
    the driven machine is an air compressor;
    whether or not the fluid load is present is detected by determining whether or not pressure in a space to which the fluid is discharged by the driven machine is smaller than a set value; and
    whether or not the steam load is present is detected by determining whether or not the steam pressure of the area where the steam from the prime mover and the steam from the by-pass path are supplied is smaller than a predetermined value.

10. The steam system according to claim 3, comprising:
    a boiler for supplying steam to the prime mover through the steam supply path; wherein
    drain from the prime mover is supplied to a water supply tank for the boiler.

11. The steam. system according to claim 10, wherein the compressor is cooled using water supply to the boiler or to the water supply tank.

\* \* \* \* \*